May 16, 1933. A. D. MAURY 1,909,621
BRAKE MECHANISM FOR AUTOMATIC FISHING REELS
Original Filed Sept. 22, 1930 2 Sheets-Sheet 1

INVENTOR:
Alfred D. Maury,
BY
Bodell & Thompson
ATTORNEYS.

May 16, 1933.  A. D. MAURY  1,909,621
BRAKE MECHANISM FOR AUTOMATIC FISHING REELS
Original Filed Sept. 22, 1930  2 Sheets-Sheet 2
FIG-4-
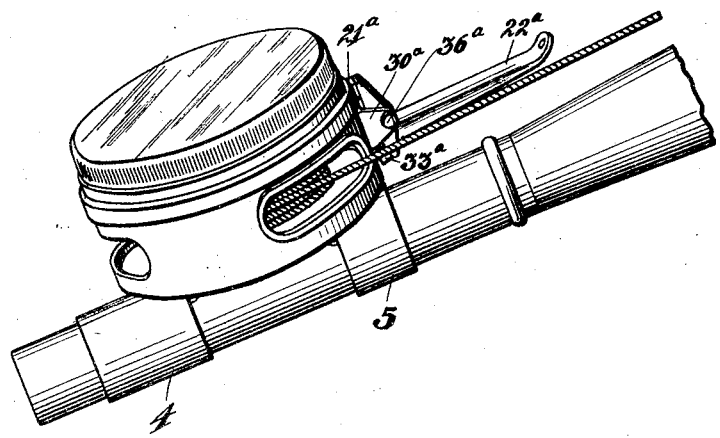
FIG-5-
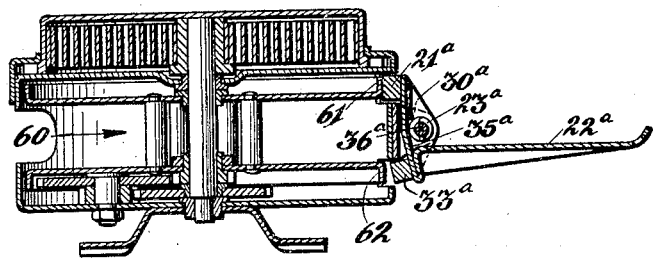
FIG-6-
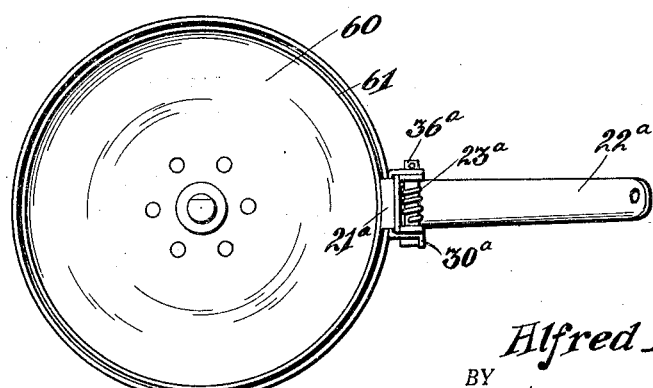
INVENTOR:
Alfred D. Maury,
BY
Bodell & Thompson
ATTORNEYS.

Patented May 16, 1933

1,909,621

UNITED STATES PATENT OFFICE

ALFRED D. MAURY, OF ILION, NEW YORK, ASSIGNOR TO MARTIN AUTOMATIC FISHING REEL CO., INC., OF MOHAWK, NEW YORK, A CORPORATION OF NEW YORK

BRAKE MECHANISM FOR AUTOMATIC FISHING REELS

Application filed September 22, 1930, Serial No. 483,540. Renewed October 3, 1932.

This invention relates to automatic fishing reels or reels in which the reel on which the line is wound is spring actuated to wind up the line, and has for its object a particularly simple and efficient control for a plurality or two brakes acting with different forces on the reel, said control consisting of a single operating finger or grip lever which when operated to an intermediate position releases one brake so that the reel runs comparatively free and is free to be wound by its spring to wind up the line or take up the slack therein, and upon further movement applies a heavier brake which may practically lock the reel from rotation or apply different degrees of force thereto to offer different resistances to the pull of the fish and upon release restores the brakes to their original position.

The invention consists in the novel features and in the combinations and constructions hereinafter set forth and claimed.

In describing this invention, reference is had to the accompanying drawings in which like characters designate corresponding parts in all the views.

Figures 4, 5 and 6 are views similar to Figures 1, 2 and 3 of a reel embodying a modified form of my invention, Figure 6 differing from Figure 3 in that the reel omitted in Figure 3 is shown in Figure 6.

Figure 1:
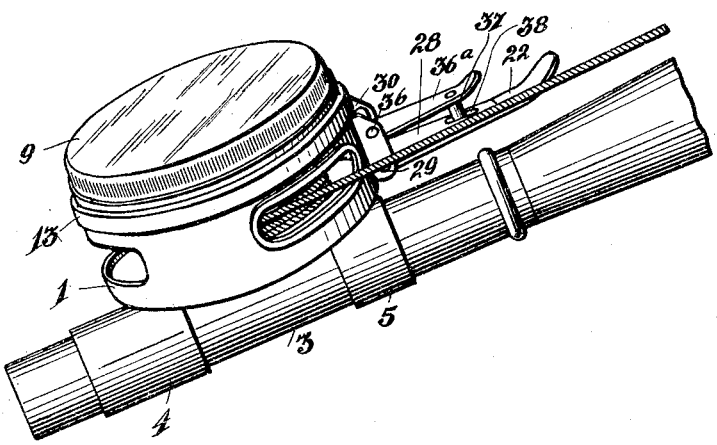
Figure 1 is a perspective view of a reel embodying my invention, the same being shown as mounted upon the handle or butt end of a fish pole.

In bait casting, the pole and the control of the line and the reel must be accomplished with one hand. Also, in fishing it is often necessary while playing the fish to control the reel and the line with one hand while the other hand is required to maintain the fisherman's balance when in an awkward position or to handle a landing net etc., all as will be understood by skilled fishermen.

This invention comprises an automatic fishing reel having particularly simple brake mechanism whereby the winding of the automatic reel and the unwinding thereof by the fish or by the plug when casting is readily controlled by the same hand holding the pole. The reel mechanism itself may be of any suitable form, size and construction and forms no part of this invention. It comprises generally a cup shaped housing 1 having means as the usual prongs 2 for attachment to the handle or butt end of the fish pole 3 by means of the usual rings 4, 5, the ring 5 being a slip ring, a reel 6 having a hub or sleeve 7 mounted on an arbor 8 rotatably mounted in the housing, a spring barrel 9 at the outer side of the cup shaped housing and having a coil spring 10 therein secured at one end to the barrel and at its other end to a hub 11 slidably and detachably secured to the outer end of the arbor 8, the spring barrel having peripheral ratchet teeth at 12 and a retaining ring 13 for holding the barrel assembled to the hub. The retaining ring carries one or more pawls, not shown, for coacting with the ratchet teeth. The motion is transmitted from the arbor 8 to the reel through a train of gears consisting of a gear 14 mounted on the arbor 8 to rotate therewith adjacent the bottom of the housing 1 and meshing with a pinion 15 on the stud 16 projecting from the bottom and fixed to a gear 17 rotatably mounted on said stud, the gear 17 meshing with a pinion 18 fixed to the hub of the reel.

The inner side of the spring barrel 9 or the open end of the housing is closed by a plate 19 having a bearing 20 on the arbor 8.

The construction thus far described, insofar as this invention is concerned, is old and well known.

This invention comprises generally a pair of brakes for acting on the reel, one being normally arranged in braking position and the other out of braking position, a single operating member or finger lever acting on the pair of brakes to normally apply one brake and movable into an intermediate position to release the normally applied brake connections between the finger lever and the normally released brake and operable to apply the normally released brake when the finger lever is moved beyond intermediate position. The normally arranged brake applies a greater braking force than the normally applied brake and may be applied with sufficient force to practically lock the reel from rotation.

21 designates the normally applied brake or brake member mounted on a spring pressed arm 22, for convenience called an operating lever, this being arranged to extend along the handle of the fish pole and having its inner end located in the housing 1 and reversely bent at 23 at its inner end to provide spring means, the reversely bent portion being fixed at 24 to the bottom of the housing.

As illustrated, this brake acts upon a brake disk 25 located in the housing and mounted upon the hub or sleeve 7 of the reel 6 in any suitable manner. It is here shown as fixedly clamped between a collar 26 on the sleeve 7 and a spring or dished disk 27 between the adjacent head of the reel and said brake disk. The manner of assembling the brake disk in the reel construction per se forms no part of this invention.

The brake 21 coacts with a companion brake member 28, this being a lever fulcrumed at 29 between its ends and having one arm pressing against the rear side of the brake disk 25 on the side opposite to that against which the brake member 21 presses. In other words, the lever 28 coacts pinch lever fashion with the brake 21. The other arm of the brake member 28 extends alongside the operating lever 22 and the action of the lever 22 under the influence of its spring means 23 holds the brake shoe 21 applied to one side of the disk 25 and the lever 28 to the other side of the disk 25.

Figure 3:
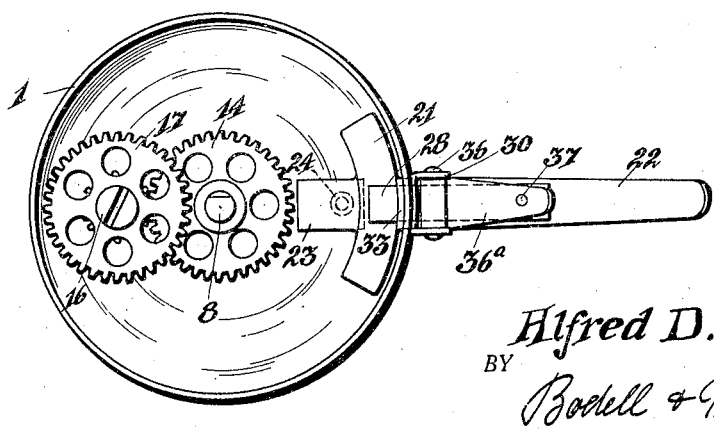
Figure 3 is a face view looking into the housing, when all the parts are locked except a portion of the brake mechanism and the portion of the motion transmitting mechanism between the spring arbor and the reel.

The brake shoe 21 is arcuate as shown in Figure 3. The fulcrum 29 is a pin held between a pair of spaced apart lugs 30 provided on a bracket secured as by rivets 31 to the periphery of the housing 1. By pressing the lever 22 toward the handle of the fish pole, the brake shoe 21 and brake lever 28 will be released permitting the reel to run free or to be restrained only by the force of the winding spring or the spring to wind up the reel to pull in or take up slack in the line.

Figure 2:
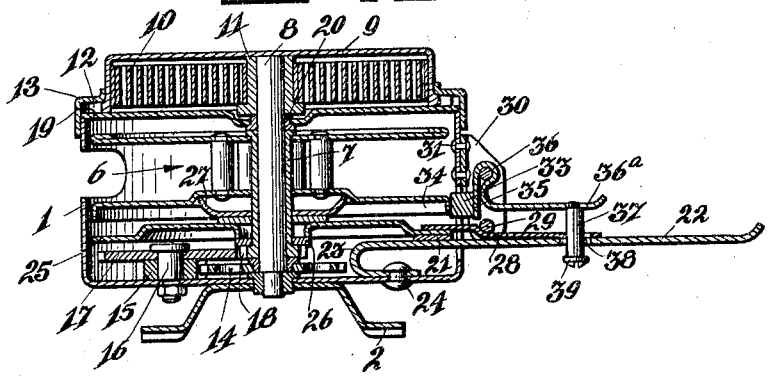
Figure 2 is a longitudinal sectional view through the reel.

33 designates a second brake which is applied to a flange 34 on one of the heads of the reel 6. As shown in Figure 2, this brake is carried by a lever arm 35 pivoted on a pin 36 mounted between the lugs 30. The lever arm 35 is part of or connected to a lever 36a which extends substantially parallel to the lever 22 and spaced apart therefrom, and it is connected to the lever arm 22 by means including a lost motion connection here illustrated as a pin 37 fixed to the lever 36a and extending through a slot 38 in the lever arm 22 and having a head 39 normally spaced apart from the lever arm 22 to permit movement of the lever 22 to an intermediate position wherein the brake means 21 and 28 only are released.

The brake 33 is normally in released position and upon movement of the operating lever 22 to an intermediate position, the brake means 21 and 28 will be released, such operation taking up the lost motion between the lever 22 and the head 39 of the pin 37 so that further movement of the lever 22 beyond intermediate position will apply the brake 33.

As before stated, the brake 33 is applied with greater force than the brakes 21 and 28 and can be applied with sufficient force to restrain the reel from being unwound by the pull of the fish.

In Figures 4, 5 and 6 a modified embodiment of the invention is shown applied to a slightly different reel structure in which the brake disk is omitted and both brakes are applied directly to the reel.

In Figures 4, 5 and 6, the reel 60 is shown as provided with annular flanges 61, 62 on each head thereof and the light and heavy brakes 21$^a$ and 33$^a$ carried at the opposite end of the lever 35$^a$ pivoted between its ends at 36$^a$ to lugs on the housing, the operating lever 22$^a$ being secured to and preferably formed integral with the lever 35$^a$. The lever 35$^a$ is acted upon by a spring 23$^a$ which normally tends to hold the light brake 21$^a$ applied to the flange 61 and the heavy brake 33$^a$ released from the flange 62. The brake 33$^a$ is normally spaced apart from its coacting companion brake flange 62 a sufficient distance to permit the brake 21$^a$ to be withdrawn before the brake 33$^a$ is applied, so that upon movement of the operating lever 22$^a$ to intermediate position releases the reel of the brake 21$^a$ without applying the brake 33$^a$ and further movement of the lever 22$^a$ applies the brake 33$^a$, that is, the lost motion is provided between the brake 33$^a$ and the flange 62.

Upon release of the lever 21$^a$, the spring 23$^a$ returns the brakes to their normal position with the brake 21$^a$ applied.

In either form of my invention, the light brake is normally applied to the reel and upon applying pressure to the operating lever 22 or 22$^a$, the reel is relieved of all brakes so that in bait casting, the bait can be cast or when a fish is caught, the reel will wind or take up slack in the line, or in other words, the fish can be played.

Upon further movement of the operating lever 22 or 22$^a$, the heavy brake is applied restraining the fish from running away or in casting, facilitating the placing of the bait in the desired spot, after it has been thrown over the spot.

What I claim is:

1. In an automatic fishing reel, the combination with a suitable housing for attachment to the handle of a fish pole, a reel mounted in the housing, winding spring mechanism and motion transmitting means between the same and the reel, of a brake operable on the reel to normally restrain rotation thereof, a second normally released brake for acting on the reel, a lever connected to the first brake and operable into an intermediate position to release the first brake, means connecting the lever and the second brake whereby upon further operation of the lever from intermediate position, the second brake is applied.

2. In an automatic fishing reel, the combination with a suitable housing for attachment to the handle of a fish pole, a reel mounted in the housing, winding spring mechanism and motion transmitting means between the same and the reel, of a brake operable on the reel to normally restrain rotation thereof, a second normally released brake for acting on the reel, a lever connected to the first brake and operable into an intermediate position to release the first brake, means connecting the lever and the second brake whereby upon further operation of the lever from intermediate position, the second brake is applied, one of the brakes having a greater braking action than the other.

3. In an automatic fishing reel, the combination with a suitable housing for attachment to the handle of a fish pole, a reel mounted in the housing, winding spring mechanism and motion transmitting means between the same and the reel, of a brake operable on the reel to normally restrain rotation thereof, a second normally released brake for acting on the reel, a lever connected to the first brake and operable into an intermediate position to release the first brake, means connecting the lever and the second brake whereby upon further operation of the lever from intermediate position, the second brake is applied, said connecting means including a lost motion connection permitting movement of the lever to release the first brake without applying the second brake.

4. In an automatic fishing reel, the combination with a suitable housing for attachment to the handle of a fish pole, a reel mounted in the housing, winding spring mechanism and motion transmitting means between the same and the reel, of a pair of brakes for acting on the reel with different restraining forces, one being normally in braking position and the other out of braking position, an operating lever connected to both brakes and spring means acting to hold the lever in normal position and apply one of the brakes and to return the lever and the brakes to their normal position when the lever is released, said lever being movable to an intermediate position when neither brake is applied and to an extreme operative position when the normally released brake is applied.

5. In an automatic fishing reel, the combination with a suitable housing for attachment to the handle of a fish pole, a reel mounted in the housing, winding spring mechanism and motion transmitting means between the same and the reel, of a brake operable on the reel to normally restrain rotation thereof, a lever connected to the brake to release the same, and spring means acting on the lever to move it to normal position to apply the brake, a second normally released brake for acting on the reel, a lever arm for operating the same and means connecting said lever arms and said operating lever whereby movement of the operating lever operates the second brake.

6. In an automatic fishing reel, the combination with a suitable housing for attachment to the handle of a fish pole, a reel mounted in the housing, winding spring mechanism and motion transmitting means between the same and the reel, of a brake operable on the reel to normally restrain rotation thereof, a lever connected to the brake to release the same, and spring means acting on the lever to move it to normal position to apply the brake, a second normally released brake for acting on the reel, a lever arm for operating the same and means connecting said lever arm and said operating lever whereby movement of the operating lever operates the second brake, said connecting means including a lost motion connection whereby the second brake is applied only after the first brake is released and the operating lever has an intermediate position where neither brake is applied.

7. In an automatic fishing reel, the combination, with a suitable housing for attachment to the handle of a fish pole, a reel mounted in the housing, a winding spring mechanism and motion transmitting means between the same and the reel; of a pair of brakes operable on the reel, one being arranged to normally restrain rotation of the reel and the other being normally released, and an operating member common to both brakes and operable to a central position to first release the first brake and from central position to apply the second brake.

8. In an automatic fishing reel, the combination, with a suitable housing for attachment to the handle of a fish pole, a reel mounted in the housing, a winding spring mechanism and motion transmitting means between the same and the reel; of a pair of brakes operable on the reel, one being arranged to normally restrain rotation of the reel and the other being normally released, and an operating member common to both brakes and operable to a central position to first release the first brake and from central position to apply the second brake, said operating member comprising a lever and connections between the lever and the brakes respectively, said connections including arms extending in opposite directions relatively to the axis of the lever.

9. In an automatic fishing reel, the combination, with suitable housing for attachment through the handle of a fish pole, a reel mounted in the housing, a winding spring mechanism and motion transmitting means between the same and the reel; of a pair of brakes operable on the reel, one being arranged to normally restrain rotation of the reel and the other being normally released, and an operating member common to both brakes and operable to a central position to first release the first brake and from central position to apply the second brake, said operating member comprising a lever and connections between the lever and the brakes respectively, said connections including arms extending in opposite directions relatively to the axis of the lever, the brakes being carried by said arms respectively.

In testimony whereof, I have hereunto signed my name, at Ilion, in the county of Herkimer, and State of New York, this 27 day of Aug., 1930.

ALFRED D. MAURY.